(12) United States Patent
Shields et al.

(10) Patent No.: US 8,295,700 B2
(45) Date of Patent: Oct. 23, 2012

(54) DISTRIBUTED PACKET SWITCH FOR USE IN A NETWORK

(75) Inventors: James A. Shields, Whitehad (IE); John Dunne, Dublin (IE); Thomas Farrell, Dublin (IE)

(73) Assignee: Intune Technologies (IE)

( * ) Notice: Subject to any disclaimer, the term of this patent is extended or adjusted under 35 U.S.C. 154(b) by 980 days.

(21) Appl. No.: 12/120,074

(22) Filed: May 13, 2008

(65) Prior Publication Data

US 2008/0310839 A1    Dec. 18, 2008

Related U.S. Application Data

(60) Provisional application No. 60/917,836, filed on May 14, 2007.

(51) Int. Cl.
*H04J 14/00*    (2006.01)
(52) U.S. Cl. .......... 398/51; 398/54; 398/45; 398/59; 398/58

(58) Field of Classification Search .......... 398/51, 398/54, 45, 48, 49, 59, 55, 56, 66, 68, 58, 398/43; 370/235, 236, 230, 229, 231, 232
See application file for complete search history.

(56) References Cited

U.S. PATENT DOCUMENTS

| | | | | |
|---|---|---|---|---|
| 6,674,971 | B1 * | 1/2004 | Boggess et al. | 398/139 |
| 7,733,810 | B2 * | 6/2010 | Denecheau et al. | 370/258 |
| 2002/0067726 | A1 * | 6/2002 | Ganesh et al. | 370/392 |
| 2002/0075891 | A1 * | 6/2002 | Souissi | 370/442 |

* cited by examiner

*Primary Examiner* — M. R. Sedighian
(74) *Attorney, Agent, or Firm* — McDonnell Boehnen Hulbert & Berghoff LLP

(57) ABSTRACT

A distributed packet switch to control data packet flows in a network is described. The distributed packet switch includes a means for operating over an asynchronous burst optical closed fiber medium. The distributed packet switch also includes at least one control system provided at a node to control data packet flow characteristics, such that the switch is configured to operate dependent on at least one efficiency parameter.

11 Claims, 2 Drawing Sheets

DISTRIBUTED PACKET SWITCH FOR USE IN A NETWORK

FIELD

This invention relates to a method and apparatus for construction of a switch for connecting flows of packet data between ports or nodes for use in a communication network.

BACKGROUND

Telecommunications networks are used to provide large scale revenue generating services to both residential and business subscribers. Services provided to these subscribers have migrated over the past ten years from being primary voice communications, often referred to as POTS or Plain Old Telephony Services, to a wider range of services based on packet transmission to interconnect more computationally sophisticated terminal devices and service platforms. Subscriber bandwidth delivery has substantially increased and continues to do so such that when the infrastructure will support it, carriers will be technically able to offer all key consumer services over a single packet based network structure.

Evolved technology has permitted increased packet based bandwidth delivery to the subscriber premises, and sophisticated L3 and above protocols and content management and control architectures have been developed for use in the core, but the infrastructure linking the edge to the core is not ideal for supporting the growth caused by integrated service delivery. This is true for unicast application to person services, such as IPTV, but is more acutely so for broadband person to person peering services such as video exchange and interactive gaming. This is illustrated by considering the carrier network as being divided into three zones. The first zone is the connection between the packet based service edge device and the subscriber. This is known as the access network. The second zone is the connection between the packet based service edge devices and the core network devices. This is known as the collector network. The third zone is the core, which provides connection between collector networks.

Current technology in the collector provides interconnection between the packet service edge devices and core devices using fixed DWDM optical channels. These are provided at the service edge as bi-directional standard packet interfaces operating at high bandwidth. An example of this type of interface is 10 Gbit Ethernet. As the optical channel has fixed capacity, network planning dictates that the occupancy of the channel is less than the full capacity, to permit the smooth flow of packets in combined baseband with superimposed burst peaks. As the access network bandwidth increases, additional optical ports are required to provide connectivity back to the core. The result of this is that the service edge device interfaces are transferred to the core of the network, where they need to be switched for grooming and aggregation purposes before handoff to the core devices. A problem with this arrangement is that with increasing uptake of services, there is an increase in partially filled optical DWDM channels through the collector and a corresponding rise in switching ports and fabric capacity at the collector head end.

Distributed packet switches based on burst optical technology have been described in two broad categories. These are open optical systems and closed optical systems. An open optical system is one that provides external optical connections. A closed optical system permits the use of a deterministic optical power management control system. This means that there are no external optical interfaces on the line side. All of the external interfaces to this invention are on the port side. Port side interfaces may be on optical fibers, but no interfaces to the optical switching and transmission system are provided externally. Distributed packet switching based on closed optical systems has been described in two categories. These are synchronous and asynchronous systems. With the former precise timing is distributed around the closed optical system and this is used to ensure that each port on the distributed switch can be given deterministic access to the available capacity of the fiber in conjunction with other ports also requiring access. This process is known as scheduling.

However, a shortcoming of a synchronous system is the complexity of precise timing, which leads to the impractical need to control the inter node fiber lengths, and the inefficiency resulting from the misalignment of packet lengths to transmission container unit lengths available in the optical system.

Distributed packet switches based on asynchronous burst optical switching has been previously described in PCT patent publication number WO2005/125264. In these systems a means of collision avoidance is provided such that a port on the system can detect an optical channel is free, switch the source laser to the free channel and transmit a burst of packet data. A delay is provided such that if the channel is subsequently detected as being used by an upstream node, the transmission can be truncated and a collision is avoided. This system offers efficient use of the optical medium, responsive access to the optical medium at any local port, and does not have any impractical restrictions on fiber length or precise timing complexities.

However, a drawback of a distributed switch with asynchronous access with collision avoidance technology is that when the network is heavily loaded with flows of packets, an optical upstream channel can secure an optical channel for its needs and hold on to it in response to loading demands thus blocking downstream nodes from gaining access.

While this is not problematic per se in fully meshed flows of traffic, it is unusable in the collector application where a large proportion of the flows of packets are converging on optically downstream nodes. To overcome this, methods have been proposed where a feed back mechanism arbitrates access to an optical channel from an oversubscribed destination. However this simple single dimensional approach gives rise to lock up of wavelength selection at the source nodes, where each node can only access its furthest neighbor with the only way out to reset, or oscillations occur, where the depth of occupancy of input data buffers alternatively drains and fills. With both of these conditions latency and jitter are induced into services carried through the distributed switch rendering it impractical for real networking applications.

SUMMARY

The present invention concerns the application of a scheduling and optical switch control system that enables a distributed packet switch to overcome the above mentioned problems.

According to the present invention there is provided a distributed packet switch to control data packet flows in a network, said switch comprising: means for operating over an asynchronous burst optical closed fiber medium; and at least one control system is provided at a node to control data packet flow characteristics, configured to operate dependent on at least one efficiency parameter.

This invention overcomes the above mentioned problems by using burst switching technology to build a distributed packet switch to interconnect packet service edge devices with core devices in the network in a manner such that the flows of packets are directly groomed and aggregated within the optical transmission medium. The advantage of this arrangement is that heretofore no distributed packet switch operating over an asynchronous burst mode and comprising a control system dependent on an efficiency parameter has been proposed.

Suitably, the efficiency parameter is defined by the ratio between the amount of information transmitted from a device during a time interval to the theoretical maximum amount that could be transmitted during the interval for at least one data packet flow. The inventors of the present invention discovered that this parameter is very suitable for controlling operation of the data packet flows in the network.

Suitably, a control system is provided at a node of the switch to maintain required data flow packet characteristics and at least one control system communicates with other control systems through a common network wide signaling channel.

Suitably, the control system may comprise a source arbiter operating with local information available at the node and a scheduling processor comprising means for receiving inputs from other control systems and the local information available at the node. The scheduling processor may calculate priority parameters of the source arbiter from the efficiency parameter.

An aspect of the invention is that the source arbiter operates entirely with local information available at the node on which it exists, while the scheduling processor takes input from other scheduling processors in the closed optical system as well as from data made available to it from the node on which it is running, and from systems higher in the network control, such as a user, higher layer control, or operations and maintenance (OAM) system.

The addition of a control system at each node modifies the operation of the switch control and collision avoidance system in such a manner to maintain required flow characteristic guarantees network wide, while allowing the redistribution of unused spectral resources to heavy input port loadings. The control systems at each node communicate through a common network wide signaling channel. This arrangement results in a fast responding direct access control system used to select which data to transmit for how long on which channel, that has the selection criteria modulated by a network wide control system operating over a longer time constant to maintain desired flow characteristics as defined through a user input.

Suitably, the control system comprises means to modify priority on the streaming of packet data from input queues to a node according to any or all combinations of the following inputs:

a. a set of flows specified by a user;
b. average flow rate through the input port either aggregated or per queue, where the average can be determined over a configurable interval;
c. average delay experienced by packets flowing through a port, where the average can be determined over a configurable interval;
d. loading conditions of all of the other ports on the closed fiber medium as determined by the last received information from the other ports in the closed fiber medium over a signaling channel common to all of the ports on the closed optical system;
e. an allocation from either a local or central computation system that modifies the flows specified by the user.

Preferably, the control system responds autonomously to the state of current inputs according to parameters input from a second control system operating from inputs provided from a user and from the remainder of the other control systems in the network. Ideally the first control system uses a very short scheduling interval for calculation of which one of the input queues to transmit from. Suitably, the results of this transmission update credits, which can also be updated by the second control system operating over a longer scheduling interval. In this embodiment, the credits are allocated with queues to represent their priority. Providing a first short scheduling interval control system inside a longer scheduling interval control system has the advantage of minimizing latency.

Ideally, there is provided means for a user to input allocated data flow characteristics, wherein said means for allocating comprises a two dimensional accumulator which is used to prevent acceptance of user inputs if the inputs cause the accumulator to go beyond doubly stochastic for the packet switch throughput required.

Suitably, the default flows are set as equal for all ports to all other ports such that without intervention from the user equal fairness is attributed to all ports.

In another embodiment, the control system monitors the flow of data through an input port and into the optical burst medium and broadcasts a form of the monitored flow of data to all other control systems on all other ports in the network. The switch may comprise means for a user to set a fabric efficiency parameter, wherein the parameter of fabric efficiency is used as an input to the scheduling processor.

In a further embodiment, there is provided a method of operating a distributed packet switch to control data packet flows in a network, said method comprising: operating the distributed packet switch over an asynchronous burst optical closed fiber medium; and controlling at a node data packet flow characteristics, such that said distributed packet switch is configured to operate dependent on at least one efficiency parameter.

There is also provided a computer program comprising program instructions for causing a computer program to carry out aspects of the invention which may be embodied on a record medium, carrier signal or read-only memory.

BRIEF DESCRIPTION OF THE DRAWINGS

The invention will be more clearly understood from the following description of an embodiment thereof, given by way of example only, with reference to the accompanying drawings, in which.

DETAILED DESCRIPTION

Figure 1:
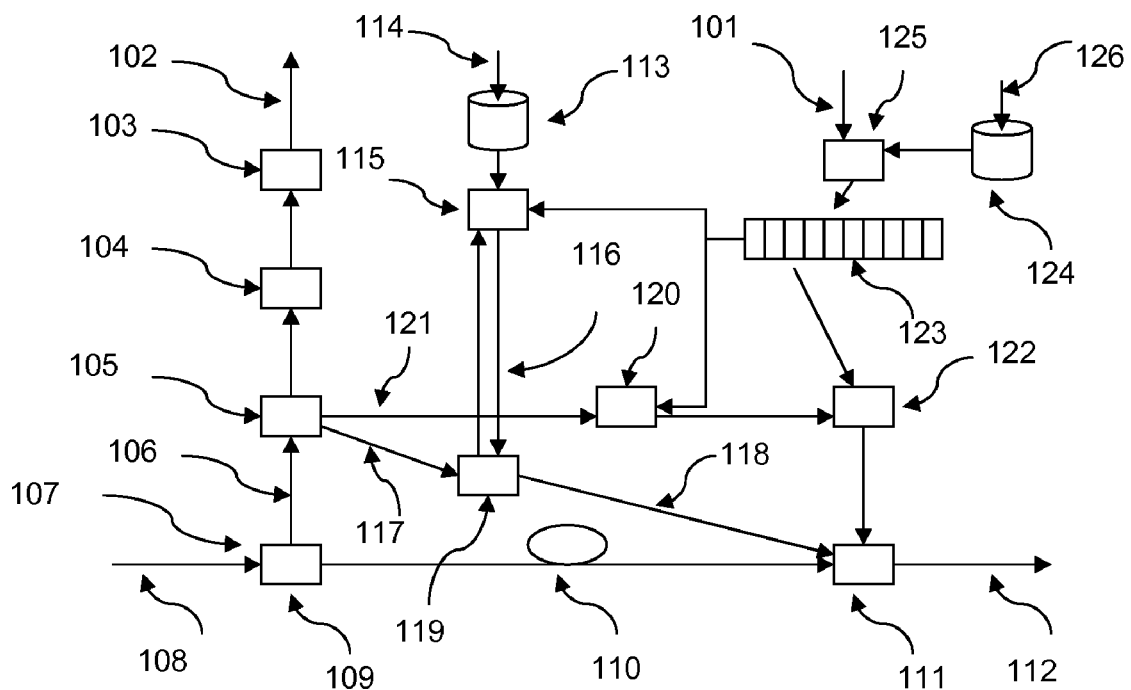
FIG. 1 illustrates a distributed packet switch according to one embodiment of the present invention.

Referring to FIG. 1, there is illustrated a section of the closed optical system according to the present invention with signals, in the form of data packets entering at 108, traversing a splitter 109, and entering delay line 110. Optical signals generated at the port are combined at 111 and exit the node to the closed optical system at 112. The receive path of this node begins with the optical signal split from the main system 106. This enters an optical de-multiplexing module, which can be engineered in a variety of ways including a preferred embodiment of an array wave guide. An optical control channel 117 is also split out at this point and passed to the communications switch 119.

In a preferred embodiment, switch 119 is an electrical packet switch. This drops and inserts packets (data packets) for the node along interface 116 to a scheduling processor 115. A control channel is then optically added to the closed optical system at 111 over interface 118. Sensor 105 also provides a simple carrier sense for all of the active wavelengths on the optical system and presents these to the source arbiter over interface 121. This is a parallel bus of carrier sense truth, such that the presence of a carrier gives a logical "1" and the absence a logical "0". Finally, sensor 105 drops the receive channel to the burst optical receiver 104. This locks to the carrier rate of the burst using a pre-amble and finds the burst header, which is stripped off for OAM purposes and the content passed to an elastic input buffer 103. This buffer recreates the packets from the burst transmissions by holding bits in the buffer that constitute partial packets until the remaining packet data is received so that only full data packets exit the port at 102.

In the transmit direction data packets enter a port at 101 and are passed to an address processing unit 125. This looks up the address in the table stored in 124, which has been written and maintained from the network control plane through interface 126. On determining which destination the packet is for, address processing unit 125 writes it into the corresponding virtual output queue 123. Burst optical switch 122 then selects which of the queues to service under control of a source arbiter 120. The burst optical switch 122 selects an optical channel, streams out a quantity of data from the corresponding virtual output queue in 123, encapsulates this in a burst envelope and passes it to optical combiner 111. The source arbiter 120 uses the carrier sense 121 and the status of the output queues and additional switch control parameters from the scheduling processor 115 to select the channel and quantum of information to be transmitted. Scheduling processor 115 maintains an overall control over the flows through the port to all destinations and uses the switch parameters stored in 113 and entered by a network control plane, user or OAM system over 114, and communicates with other scheduling processors through the control channel to do this.

The source arbiter 120 and scheduling processor 115 function together to form the control system added to the distributed packet switch to produce packet flow characteristics that may be used in network applications such as, but not limited to, collection, aggregation and grooming.

Another aspect of the present invention is that the source arbiter responds to the current state of the virtual input queues 123 and the current state of occupancy of the fiber using interface 121, and combines these algorithmically with parameters set by the scheduling processor to select which queue to transmit from next and how much to transmit. The source arbiter is therefore responding in real time to the arrival of packets at the input to the distributed switch, but has its switch selection algorithm modulated by the scheduling processor. The scheduling processor is monitoring flows of packets from the source to destinations. These flows are compared with provisioned allocations stored within the node 113. Excesses or deficits in the flows are used both to modulate the algorithm of the source arbiter and to communicate the current flow conditions to other source arbiters on the other nodes around the closed optical system. The flows can be monitored in relation to a 2-D accumulator. If the flows are less than that permitted by the values in the accumulator, an algorithm may re-allocate the resources reserved for the underused flows to other flows. The algorithm can therefore compare the flows requested as found in the 2-D accumulator, with the actual flows in the switch, and make adjustments to the actual flows in the switch accordingly.

In another aspect of the invention, there is provided means for a user to input allocated data flow characteristics, wherein said means for allocating comprises a two dimensional accumulator which is used to prevent acceptance of user inputs if the inputs cause the accumulator to go beyond doubly stochastic for the packet switch throughput required. In other words, the total packet flows to any node in the network do not exceed the capacity of the node while at the same time the total flows from any node does not exceed the capacity of that node. Thus, a user can provide a 2-D flow matrix to ensure efficiency of the network is maintained.

In an exemplary embodiment of the present invention, the source arbiter is constructed from an application specific integrated circuit (ASIC), or field programmable gate array (FPGA). The source arbiter 120 samples the current queue status and looks for head of line delay and queue depth. These are combined with the output from the optical channel monitor, and the modulation parameters from the scheduling processor, and sent to a combinatorial logic function which selects a winning queue. The source arbiter 120 then switches a laser to the destination wavelength corresponding to the queue and writes the queue data into a burst frame for transmission. The channel monitor continues to be monitored as the burst is transmitted. If a collision potential is detected, the transmission is truncated. If no collision is detected the transmission continues until the required quantum of information is streamed from the queue. When transmission is completed, the arbiter returns the amount of successfully transmitted information to the scheduling processor. The messaging of modulating parameters from the scheduling processor to the source arbiter, and the returned transmission status are depicted in the interface 127 in FIG. 1. A person skilled in the design of electronic systems could construct the source arbiter from gates in either an ASIC or FPGA or other electronic implementation system.

In a further embodiment of the present invention, the scheduling processor 115 is constructed from a microprocessor, with attendant memory and surrounding functions, running a program dedicated to at minimum the operations resulting in modulation of the source arbiter priority output. A person skilled in the design of microprocessor systems could construct the scheduling processor. In another embodiment of this invention, the scheduling processor and the source arbiter can be built in a single electronic device.

An important aspect of the invention is the scheduling processor 115 use of an efficiency parameter in the calculation of the priority parameters of the source arbiter. Efficiency is defined as the ratio between the amount of information transmitted from a source during an interval to the theoretical maximum amount that could be transmitted during the interval. The efficiency parameter is set by an external control or user. The scheduling processor monitors the flows of information from the node to maintain the efficiency required.

Figure 2:
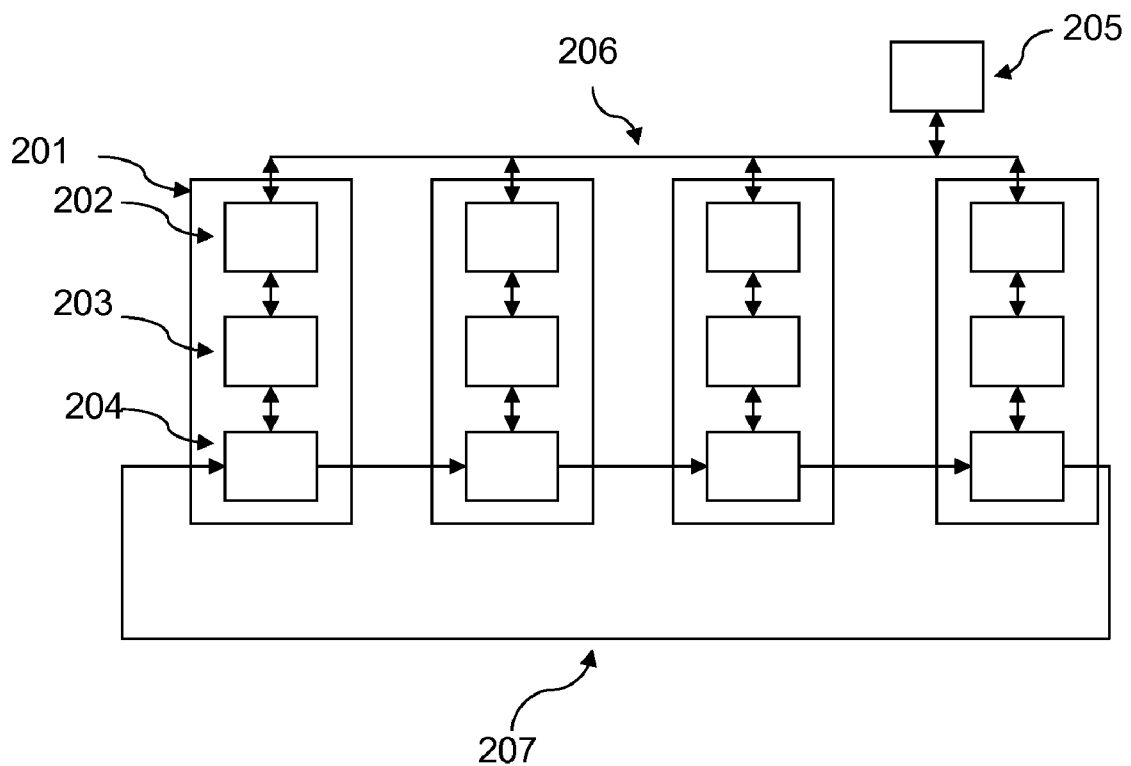
FIG. 2 illustrates a control hierarchy of the distributed packet switch.

Referring now to FIG. 2, there is illustrated a logical schematic of the overall control system of the distributed packet switch on a closed optical system. The closed optical system here, 207 is configured as a ring. Each of the nodes 201 is identical. The data plane traffic comprising packets added to and dropped from the input port, and the optical burst reception and transmission, are summarized in the logical block 204 at the bottom of each of the nodes 201. On each node is a source arbiter 203, which operates with direct contact with the local data plane 204, and has parametric configuration and flow information message exchange with the scheduling processor 202. The scheduling processors 202 are connected via a messaging interface 206. The control messaging channel 206 also connects the central control unit 205, which carries out computation of ring wide port loadings relative to provisioned allocations and returns modulation parameters to the scheduling processors 202.

An aspect of the invention is that an additional control process, shown on FIG. 2 as numeral 205, monitors the status of the flows from sources to destinations around the closed optical system and computes reallocation of spectrum resources. The results of this computation are returned to the scheduling processors over the communications channel. Each scheduling processor uses this result to modulate the provisioned allocation for the node on which it runs. The control process 205 can be contained in the same processing unit as the scheduling processor, (115,202), and is running on each node simultaneously.

As the time taken for a message to traverse the closed optical system and return with a computation is longer than the time needed for the source arbiter to complete a current switch decision, the system can be considered to have a highly responsive local control system modulated by a longer time constant control system. This is shown in FIG. 2.

Figure 3:
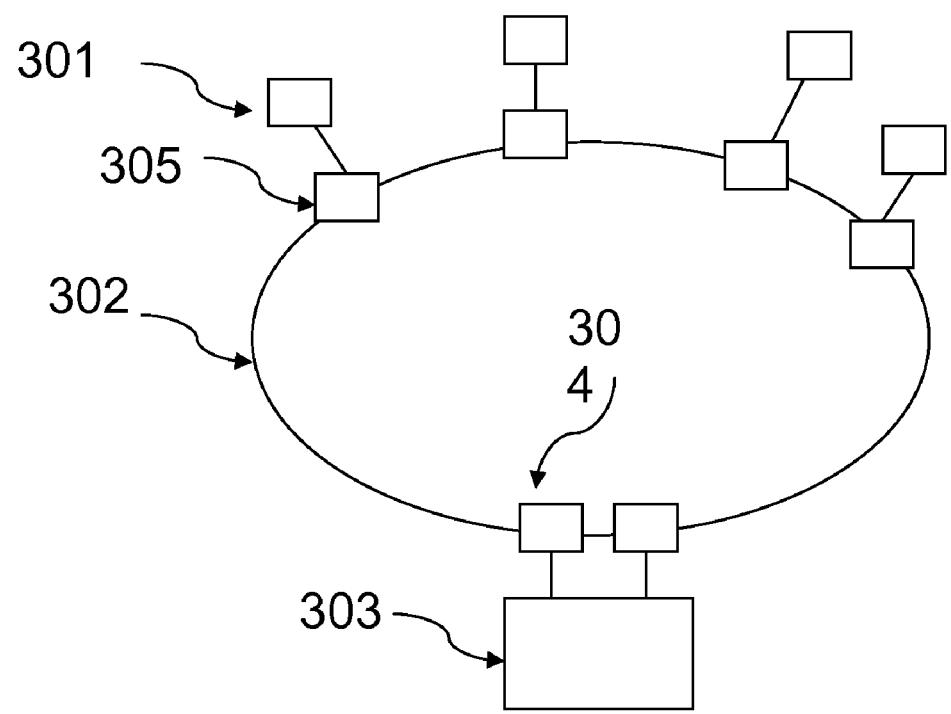
FIG. 3 illustrates a collector ring where packet edge devices are connected to packet core devices using the asynchronous burst optical switching system according to one embodiment of the present invention.

FIG. 3 shows a collector ring where packet edge devices, 301 are connected to a packet core device 303 using a distributed packet switch configured on a closed optical system 302 with edge ports 305 and core ports 304. The packet core device sends and receives up to 2 ports worth of aggregated traffic to the four packet edge devices. The distributed switch function carries out the aggregation and distribution directly onto the transmission spectrum under the control system herein described. The core ports can deliver multi-service aggregated packet flows from the packet edge devices.

In another aspect of this invention, there is a means of providing the provisioned allocations. These are flows from a source to the destinations reachable from that source in the closed optical system. In FIG. 3, there are two destinations 304 that may be reached from sources 305. The provisioned allocation corresponds to guaranteed flow parameters such as, but not limited to nodal delay or base bandwidth. In one embodiment, these parameters are mapped from VLAN tags, where the packet system operated is Ethernet frames. In another embodiment, the parameters are allocated from a user interface and associated with virtual connections placed across the distributed switch by an external control system or OAM system.

An aspect of this design is that the scheduling processor, or central control processor, maintains an accumulation of the added and subtracted provisioned allocations across the switch, such that the total capacity of the switch, as determined by the required efficiency of the switch is not exceeded.

Figure 4:
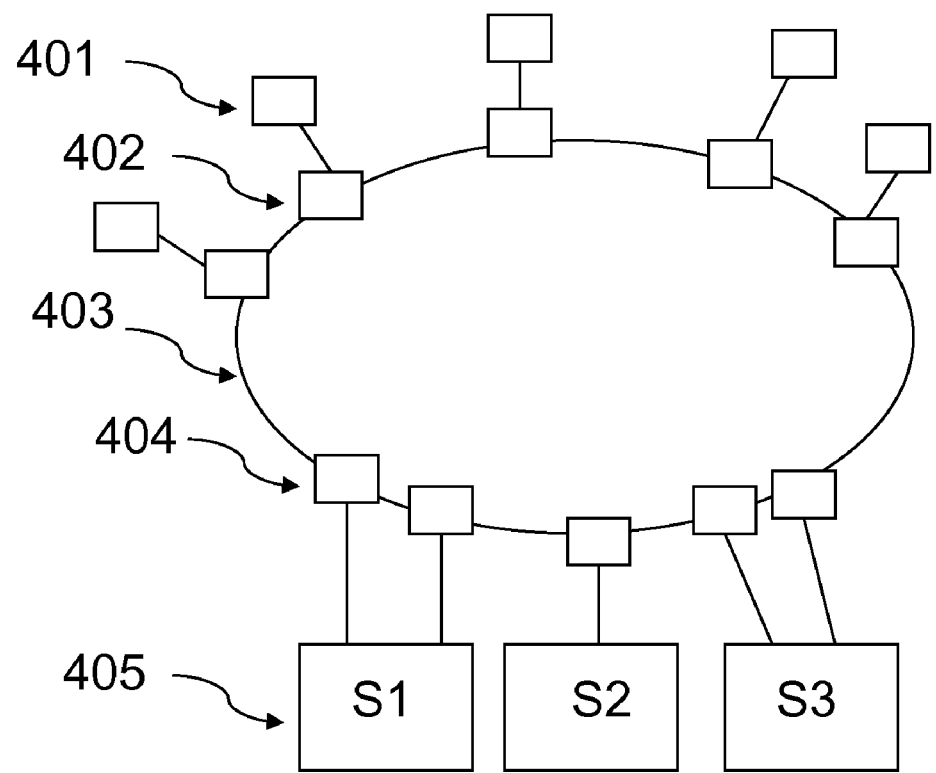
FIG. 4 illustrates a collector ring where packet edge devices are connected to packet core devices using the asynchronous burst optical switching system according to another embodiment of the present invention.

Referring to FIG. 4, there are five packet edge devices 401 connected to three packet core devices 405. The distributed packet switch has edge ports 402 and ports at the core 404 and is constructed on a closed optical system 403. Each packet core device provides a single service named S1, S2, and S3 for each of the devices. The distributed switch directs flows of packets from the packet edge devices to the correct service specific packet core device according to the service specific information on the packet header under control of the invention described herein. Examples of service specific information in the packet header are address, VLAN tag, service identifier and others. The packet distributed switch, under control of the invention described herein is directly grooming and aggregating in the contribution and distribution aspects of the collector network shown.

In a further aspect of the invention, the provisioned allocations are organized as flows directed to service specific platforms, as shown in FIG. 4. At each service platform in the core, there is delivered an aggregate of packet flows from all the edges, while in the reverse direction, the service platform may stream packet flows to any of the edges that receive aggregates of packets from multiple services. In one embodiment of this invention, the flow parameters to achieve this are determined by mapping VLAN tags to provisioned allocations according to the VLANs being service specific and the mappings being in turn provisioned by a user.

It will be appreciated that the collector is similar to that depicted in the previous drawings, but the traffic has been arranged such that the core ports have been arranged to connect to service specific packet core devices. Thus the distributed packet switch has been used to simultaneously groom and aggregate packet flows from the edge to the core eliminating the need for grooming switches in the core.

The words "comprises/comprising" and the words "having/including" when used herein with reference to the present invention are used to specify the presence of stated features, integers, steps or components but does not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The invention is not limited to the embodiments hereinbefore described but may be varied in both construction and detail.

We claim:
1. A distributed packet switch to control data packet flows in a network, said switch comprising:
   means for operating over an asynchronous burst optical closed fiber medium; and
   at least one control system that is provided at a node to control data packet flow characteristics, configured to operate dependent on at least one efficiency parameter, wherein said efficiency parameter is defined by a ratio between an amount of information transmitted from a device during a time interval to a theoretical maximum amount that could be transmitted during the interval for at least one data packet flow, and wherein the control system is adapted to select an optical channel for data transmission from the node;
   wherein the control system comprises a source arbiter operating with local information available at the node and a scheduling processor comprising means for receiving inputs from other control systems and local information available at the node; and wherein the scheduling processor calculates priority parameters of the source arbiter using the efficiency parameter.

2. A distributed packet switch as claimed in claim 1 wherein said network comprises at least one service edge device and at least one core device such that the flows of packets are directly controlled within the closed fiber medium by said control system.

3. A distributed packet switch as claimed in claim 1 wherein the at least one control system communicates with other control systems through a common network wide signaling channel.

4. A distributed packet switch as claimed in claim 1 wherein said switch comprises means for a user to set a fabric efficiency parameter, wherein the parameter of fabric efficiency is used as an input to the scheduling processor.

5. A distributed packet switch as claimed in claim 1 wherein the at least one control system comprises means to modify priority on the streaming of packet data from input queues to a node according to any or all combinations of the following inputs:
   a. a set of flows specified by a user;
   b. average flow rate through an input port either aggregated or per queue, where the average can be determined over a configurable interval;
   c. average delay experienced by packets flowing through a port, where the average can be determined over a configurable interval;
   d. loading conditions of all of the other ports on the closed fiber medium as determined by the last received information from the other ports in the closed fiber medium over a signaling channel common to all of the ports on the closed optical system;
   e. an allocation from either a local or central computation system that modifies the flows specified by the user.

6. A distributed packet switch as claimed in claim 1 wherein the at least one control system responds autonomously to the state of current inputs according to parameters input from a second control system operating from inputs provided from a user and from the remainder of the other control systems in the network.

7. A distributed packet switch as claimed in claim 1 comprising means for a user to input allocated data flow characteristics, wherein said means for allocating comprises a two dimensional accumulator which is used to prevent acceptance of user inputs if the inputs cause the accumulator to go beyond doubly stochastic for the packet switch throughput required.

8. A distributed packet switch as claimed in 7, wherein default flows are set as equal for all ports to all other ports such that without intervention from the user equal fairness is attributed to all ports.

9. A distributed packet switch as claimed in claim 1 wherein the at least one control system monitors a flow of data through an input port and into the optical burst medium and broadcasts a form of the monitored flow of data to all other control systems on all other ports in the network.

10. A method of operating a distributed packet switch to control data packet flows in a network, said method comprising:
   operating the distributed packet switch over an asynchronous burst optical closed fiber medium; and
   controlling, at a node, data packet flow characteristics, such that said distributed packet switch is configured to operate dependent on at least one efficiency parameter, wherein said efficiency parameter is defined by a ratio between an amount of information transmitted from a device during a time interval to a theoretical maximum amount that could be transmitted during the interval for at least one data packet flow, and such that an optical channel is selected for data transmission from the node;
   wherein the controlling comprises a source arbiter operating with local information available at the node, and a scheduling processor receiving inputs from other control systems and local information available at the node and calculating priority parameters of the source arbiter using the efficiency parameter.

11. A non-transitory computer-readable medium having instructions stored thereon, the instructions comprising:
   instructions for operating over an asynchronous burst optical closed fiber medium; and
   instructions for operating at least one control system at a node to control data packet flow characteristics, configured to operate dependent on at least one efficiency parameter, wherein said efficiency parameter is defined by a ratio between an amount of information transmitted from a device during a time interval to a theoretical maximum amount that could be transmitted during the interval for at least one data packet flow, and wherein the control system is adapted to select an optical channel for data transmission from the node;
   wherein the control system comprises a source arbiter which operates with local information available at the node and a scheduling processor that receives inputs from other control systems and local information available at the node; and wherein the scheduling processor calculates priority parameters of the source arbiter using the efficiency parameter.

* * * * *